US011614782B2

(12) United States Patent
He et al.

(10) Patent No.: US 11,614,782 B2
(45) Date of Patent: Mar. 28, 2023

(54) FAN BLOCKAGE DETECTION FOR AN INFORMATION HANDLING SYSTEM

(71) Applicant: Dell Products L.P., Round Rock, TX (US)

(72) Inventors: Qinghong He, Austin, TX (US); Timothy C. Shaw, Austin, TX (US); Pomin Shih, Taipei (TW); Adolfo Sandor Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 17/185,261

(22) Filed: Feb. 25, 2021

(65) Prior Publication Data
US 2022/0269323 A1 Aug. 25, 2022

(51) Int. Cl.
*G06F 1/20* (2006.01)
*G06F 11/30* (2006.01)

(52) U.S. Cl.
CPC .......... *G06F 1/206* (2013.01); *G06F 11/3058* (2013.01)

(58) Field of Classification Search
CPC ...................................................... G06F 1/206
See application file for complete search history.

(56) References Cited

U.S. PATENT DOCUMENTS

| 6,528,987 B1* | 3/2003 | Blake | G06F 1/206 324/168 |
| 2002/0101714 A1* | 8/2002 | Osecky | G06F 1/206 361/679.48 |
| 2003/0002250 A1* | 1/2003 | Yin | G06F 1/181 361/679.48 |
| 2003/0128509 A1* | 7/2003 | Oudet | G06F 1/20 361/679.48 |
| 2004/0263341 A1* | 12/2004 | Enzinna | F04D 27/008 340/606 |
| 2007/0095522 A1* | 5/2007 | Chang | G06F 1/206 165/287 |
| 2011/0133944 A1* | 6/2011 | Homer | G06F 1/206 340/635 |
| 2017/0350403 A1* | 12/2017 | Kelly | F04D 27/001 |

\* cited by examiner

*Primary Examiner* — Suresh Suryawanshi
(74) *Attorney, Agent, or Firm* — Norton Rose Fulbright US LLP (57) ABSTRACT

An information handling system may detect fan blockage for one or more fans using a target value such as the rotational rate of a fan or a duty cycle value of the pulse width modulation (PWM) signal for a fan, and a monitored value includes at least the other one of the rotational rate of the fan or the duty cycle value of the PWM signal for the fan. The information handling system may determine whether either the duty cycle value of the PWM signal for a fan or the rotational rate of the fan meets or crosses a threshold value. The threshold value, for example, may include an intake blocking warning limit or a rotational rate limit. The information handling system may then generate a notification to the user, such as a re-positioning notification. The methods described or illustrated may be entirely implemented in an embedded controller.

20 Claims, 7 Drawing Sheets

FIG. 1

| FAN speed | Target Rotational Rate (RPM) | On-board Sensor1 | | Normal Duty Cycle of the PWM Signal | Intake Blocking Warning Limit |
|---|---|---|---|---|---|
| Fan 1 | 1300 | 43 | °C On | 38% | 25% |
| | | 39 | °C Off | | |
| Fan 2 | 1900 | 50 | °C On | 55% | 30% |
| | | 45 | °C Off | | |

| BIOS Setting | Intake Blocking Warning Limit | Temperature Threshold |
|---|---|---|
| Quiet | 25% | 50 °C |
| Balanced | 40% | 43 °C |
| High Performance | 65% | 39 °C |

FAN BLOCKAGE DETECTION FOR AN INFORMATION HANDLING SYSTEM

FIELD OF THE DISCLOSURE

The instant disclosure relates to information handling systems. More specifically, portions of this disclosure relate to an information handling system determining whether a fan in the information handling system is blocked by determining whether a value in the information handling systems meets or crosses a threshold based on a target value in the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Blockage of fans may reduce or eliminate the airflow that cools the information handling system. Fans may be blocked at the inlet or at the outlet. For example, a laptop may be resting in a user's lap or on a pillow, causing the air to be unable to flow into the inlet and/or to flow out of the outlet. As another example, a foreign object may become lodged in the fan inlet and/or outlet. When a fan cannot circulate the air, the information handling system may overheat. If the information handling system overheats, the information handling system may increase the fan's revolutions per minute (RPM) to circulate more airflow. However, when the fan's RPM is increased, the fan may produce more noise. In some situations, the central processing unit (CPU) may operate slower to account for the thermal throttling in the information handling system, resulting in a noticeable performance drop to the user. If the CPU and/or the temperature of the information handling systems reaches a critical level, the information handling system may shutdown. Shutdowns, slower processing speeds, noise, and overheating may affect the user's productivity.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

To detect a fan blockage, the information handling system may use an algorithm that may include programmable rule(s) to compare a monitored value to a threshold while controlling the fan to obtain a target value. That is, one parameter of the system may be controlled, and another value monitored, wherein that monitored values has some predetermined response to a parameter being adjusted to reach a target value. For example, a fan speed may be controlled through a pulse width modulation (PWM) signal and that fan speed is generally related to the duty cycle of the PWM signal under normal operating conditions. When a change in the system occurs, such as a partial or complete fan blockage, the relationship between the fan speed and the duty cycle changes. For example, although the fan speed may still be controllable through controlling the PWM signal, relationship between the fan speed and the PWM signal is different. By monitoring the PWM signal in comparison to the fan speed, the information handling system may determine a fan blockage, such as by monitoring the PWM signal used to achieve a target fan speed and comparing the monitored PWM signal to a threshold value. For example, comparing an unblocked fan with a completely blocked fan, the PWM that holds the fan at a target value of 2700 rpm may change from 98% (at unblocked) to 53% (at fully blocked). The threshold value may be determined based on a preprogrammed algorithm, determined based on a value stored in a table in memory, or determined based on a machine learning algorithm that learns the relationship between fan speed and PWM signal. Although controlling the PWM signal to obtain a target fan speed is described in some embodiments, other embodiments of the disclosure may involve different monitored and controlled parameters. For example, other embodiments may involve fixing the PWM signal and detecting the change of RPM which can achieve similar result.

When the monitored value meets certain criteria, such as crossing a threshold value, the information handling system may notify the user of the information handling system about the potential fan blockage. For example, the programmable rule(s) may specify the threshold as a duty cycle value of a pulse width modulation (PWM) signal. The information handling system may control the power supply to the fan to achieve a target value of the rotational rate of the fan (RPM) and determine the duty cycle value of the PWM signal of the fan. The information handling system may determine whether the measured duty cycle value of the PWM signal of the fan meets or crosses the threshold. In another example, the programmable rule(s) may specify the threshold as a rotational rate of the fan. The information handling system may then control the power supply to the fan to achieve a target value of the duty cycle value of the PWM signal for the fan and determine the rotational rate of the fan. In certain embodiments, the embedded controller in an information handling system may control the PWM signal to the fan, determine the RPM of the fan using a tachometer, and may monitor different PWM values to determine fan blockage. After determining the rotational rate of the fan, the information handling system may determine whether the measured rotational rate of the fan meets or crosses the threshold. For example, the duty cycle value of the PWM signal may be set at 80%, and the RPM of the fan may change from 3972 revolutions (at unblocked) to 5133 revolutions (at fully blocked).

In some embodiments, one or more components of the information handling system, such as an embedded controller, may determine the values for a fan to detect fan blockage. For example, the threshold may be an intake blocking threshold at a 50% duty cycle value of the PWM signal. If the measured duty cycle value of the PWM signal of the fan signal meets or crosses the 50% intake blocking threshold while attempting to achieve a target RPM value, the information handling system may generate a notification. The information handling system may determine that a 75% duty cycle value of the PWM signal of the fan does not meet or cross the intake blocking threshold of 50% and may not generate a notification. However, if the duty cycle value of the PWM signal of the fan changes to 29%, then the information handling system may generate a notification that the inlet and/or the outlet of the information handling system may be blocked. In some embodiments, the notification may inform the user that the inlet and/or outlet of the fan may be blocked and may prompt the user to re-position the information handling system. In another embodiment, the information handling system may prompt the user to select an operational mode such as a Quiet Mode to reduce fan usage or High Performance to increase the fan usage regardless of noise in the settings. In some embodiments, the notification may be displayed using an operating system level application, an audio indicator, or a standard error indicator LED using blink codes.

Using the supply power to achieve a target value such as duty cycle value of the PWM signal or the rotational rate of the fan may provide the information handling system with the ability to detect changes in the information handling system. Detecting the changes in either the duty cycle value of the PWM signal or the rotational rate of the fan when the inlet and/or outlet of the fan is blocked may allow the information handling system to notify the user and/or provide accurate suggestions for the user to implement. Additionally, detection of the fan blockage using the methods described may reduce the hardware costs for implementing other techniques. Furthermore, the information handling system may detect the fan blockage at a higher degree of resolution because the duty cycle value of the PWM signal or the rotational rate of the fan provides data granularity during partial or full fan blockage, which may produce an accurate, timely indication of the fan blockage. Detecting fan blockage based on the algorithm may also allow for the information handling system to reduce or prevent operational issues and save operational and/or maintenance costs as well.

The information handling system may adjust the values and/or parameters for determining measured values of the fan, such as the duty cycle value of the PWM signal or the rotational rate of the fan, based on various considerations. For example, the information handling system may adjust the target rotational rate of the fan of the fan by implementing a different operational mode and/or accepting a new target rotations per minute (RPM) value. In some embodiments, the new target rotational rate of the fan may correspond to a system temperature rise. The information handling system may also adjust the threshold depending on the operational mode, a predetermined threshold, or a numerically-entered threshold. Additionally, the information handling system may adjust the actual values of the fan depending on the system configuration, the operational mode, or any other factor. The algorithm that may include programmable rule(s) may adjust based on the determined values and/or parameters.

In some embodiments, the algorithm to determine the fan blockage may be based on other values and/or parameters. For example, the information handling system may monitor a temperature such as the temperature from the information handling system and may determine whether the temperature of the information handling system meets or crosses a threshold. Another example may include the information handling system monitoring an audio input such as the acoustic levels of the fan or any other factor for detecting the fan blockage. In certain embodiments, the audio input may include ambient sounds or any other audio input to assist in determining whether a threshold is met or crossed. For example, a change in frequency of a detected audio signal corresponding to the fan noise may be used as information to determine that the fan is at least partially blocked.

In some embodiments, the information handling system may include one or N fans. When the information handling system includes N fans, the information handling system may have to run at a lower rotational rate of the fan to reduce sound pressure energy. Therefore, the information handling system may determine that one of the fans in the system may be blocked and adjust the rotational rate of one or more fans to ensure adequate airflow circulation. In some embodiments, the information handling system with N fans may be either N conventional fans, N dual opposite outlet fans, or a combination of conventional fans and dual opposite outlet fans.

For some embodiments, the information handling system may implement the algorithm that may include programmable rule(s) in an embedded controller, which may detect the fan blockage and notify the user before the information handling system overheats, becomes noisier, processes slower, and/or shutdowns. Implementation of the algorithm in the embedded controller may reduce or eliminate additional hardware costs and interactions with other components of the information handling system. In some the information handling system and/or embedded controller may use machine learning models to predict the fan blockage. For example, the information handling system and/or the embedded controller may sample the duty cycle value of the PWM signal of the fan, the rotational rate of the fan, and/or other criteria to determine whether a threshold has been met or crossed based on the known environment for the system. Based on the sampling, which may include the rate of change over a time period, the information handling system may predict when the inlet of the fan may be blocked by debris or another object. In another example, the information handling system and/or the embedded controller may adjust the values in the information handling or the algorithm based on the known environment for the system. With machine learning, the information handling system may notify the user before the information handling system experiences operational issues. For example, a machine learning algorithm may be trained with inputs from normal operation of the information handling system relating values of the system, including fan rotational rate and PWM signal characteristics. The system may further take action to attempt to resolve the blockage or prevent further blockage. For example, if the ambient environmental noise from audio input from the surroundings meets certain criteria established by the machine learning, the information handling system may adjust the fan to reduce disruption to the user. In some embodiments, when blockage is determined by the information handling system and the audio mic detects a loud noise floor environment, then the system acoustic sound level of the fan can use machine language logic based on ambient environmental noise to exceed a configured audible limit of the fan in attempts to fix the issue without disruption to the user.

According to one embodiment, a method may include providing, by an information handling system, a power supply to a fan for operating the fan, wherein the power supply is a pulse width modulation (PWM) signal characterized by a duty cycle value for the fan; determining, by the information handling system, a rotational rate of the fan while providing the power supply to the fan; controlling, by the information handling system, the power supply to the fan by adjusting the duty cycle value to achieve a target value, wherein the target value includes at least one of the rotational rate of the fan or the duty cycle value of the PWM signal for the fan; determining, by the information handling system, whether a monitored value exceeds (e.g., crosses either from above or below) a threshold value, wherein the monitored value includes at least the other one of the rotational rate of the fan or the duty cycle value of the PWM signal for the fan; and generating, by the information handling system, a notification based, at least in part, on the determination that the monitored value for the fan meets or crosses the threshold value. The method may be embedded in a computer-readable medium as computer program code comprising instructions that cause a processor to perform the steps of the method.

In certain embodiments, the method may include additional steps for adjusting, by the information handling system, the power supply based on the determination whether the monitored value meets or crosses the threshold value. In some embodiments, the step of determining, by the information handling system, whether the monitored value meets or crosses the threshold value further comprises sampling the monitored value over a predetermined period of time. In one embodiment, the method may further include determining, by the information handling system, a temperature of the information handling system; and determining, by the information handling system, whether the temperature of the information handling system meets or crosses a threshold temperature value, wherein the step of generating, by the information handling system, the notification is further based, at least in part, on the determination of whether the temperature of the information handling system crosses the threshold temperature value. According to another embodiment, the method may further include determining, by the information handling system, an audio input of the fan; determining, by the information handling system, whether the audio input satisfies a criteria, wherein the step of generating, by the information handling system, the notification is further based, at least in part, on the determination of whether the audio input satisfies the criteria. According to some embodiments, the step of determining, by the information handling system, whether the monitored value exceeds the threshold value comprises determining if a fixed constant RPM value is crossed. According to some embodiments, the step of determining, by the information handling system, whether the monitored value exceeds the threshold value further includes determining a percentage deviation from the target value. In some embodiments, the threshold value may be based on a linear curve calculated based on a percentage deviation from a nominal expected RPM value from the linear curve. The linear curve may be a linear PWM response curve correlating a PWM duty cycle to an achieved fan speed at various PWM duty cycles in the information handling system.

In some embodiments, the method may further include determining a potential future blockage event based, at least in part, on data collect over a period of time regarding the monitored value. In another embodiment, the method may further include, after determining the potential future blockage event, determining a background noise level exceeds a threshold level; and controlling the fan to attempt to clear the blockage. In certain embodiments, the apparatus may further include a dual opposite outlet fan, wherein the step of controlling the power supply to the fan includes controlling a power supply to the dual opposite outlet fan.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

An information handling system may reduce or prevent operational issues by notifying a user about a fan blockage.

The fan blockage may affect either the inlet or intake of the fan, the outlet or exhaust of the fan, or both. The information handling system may use an algorithm that may include programmable rule(s) to determine whether a condition(s) has been met; the condition(s) may indicate whether or not the fan is blocked, partially or fully, and, in some embodiments, may indicate a percentage of the blockage. If the condition(s) are met, the information handling system may notify the user that the inlet and/or outlet of the fan are potentially blocked, may prompt the user to re-position the information handling system, or may prompt another action. One rule or algorithm may include the determination of whether a measured value for the fan meets or crosses a threshold. One example measured value may include the duty cycle value of the pulse width modulation (PWM) signal for the fan. When determining the duty cycle value of the PWM signal for the fan, the information handling system may fix a target value for the rotational rate for the fan to cool the information handling system. Once the information handling system determines the duty cycle value of the PWM signal for the fan, the information handling system may determine whether the duty cycle value of the PWM signal meets or crosses a threshold. In some embodiments, the threshold may be a percentage deviation from the nominal expected rotations per minute (RPM) curves because of varying RPM values on a linear curve. The algorithm may specify the threshold as a duty cycle value, such as a percentage, of the PWM signal. In another example, the measured value may be the rotational rate of the fan when the information handling system sets a target value for the duty cycle value of the PWM signal for the fan. For this example, the threshold may include a value for the rotational rate of the fan. The values including the target values, the measured values, the thresholds, and/or other values may be stored in an embedded controller and/or a basic input/output system (BIOS). In other embodiments, the information handling system may implement an algorithm that may use a linear curve approach with a percentage deviation from the nominal fan response curve.

Figure 1:
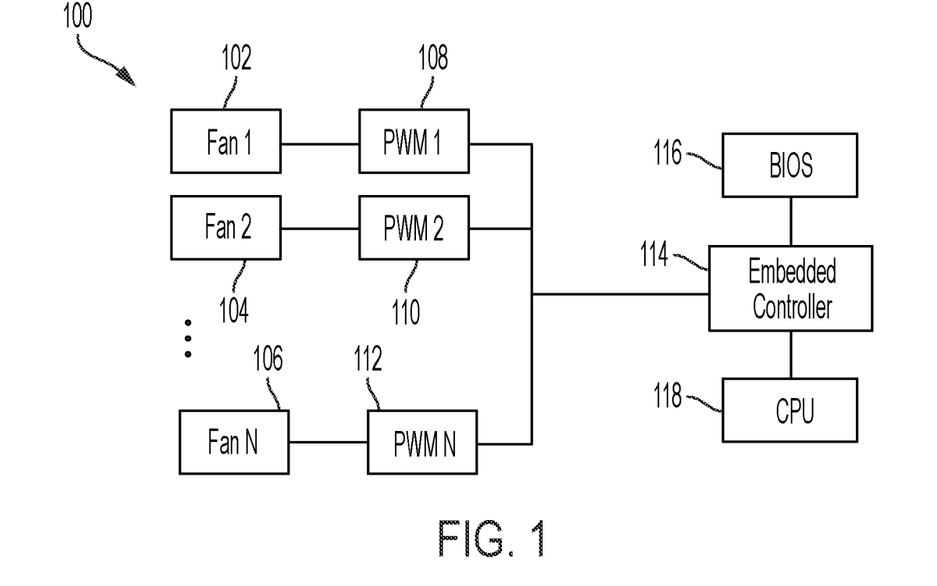
FIG. 1 is an illustration of an information handling system with one or N fans according to some embodiments of the disclosure.

When the algorithm is based on the duty cycle value of the pulse width modulation (PWM) signal for the fan, the information handling system may set a target value for the rotational rate of the fan and determine the duty cycle value of the PWM signal for the fan using an embedded controller. In another embodiment, the algorithm may be based on the rotational rate of the fan, and the information handling system may set a target value for the duty cycle value of the PWM signal for the fan and determining the rotational rate for the fan. FIG. 1 shows an illustration of the information handling system with N fans. The information handling system 100 may include fan 1 102, fan 2 104, and fan N 106. In some embodiments, the information handling system with N fans may include any type of fan, such as single outlet fans, dual opposite outlet (DOO) fans, or a combination of both types of fans. The information handling system 100 may further include pulse width modulators (PWM) for converting a digital signal into an analog signal. The PWM 108, 110, and 112 provide an analog signal with a duty cycle to transfer power to the fans 102, 104, and 106, respectively, to control a rotational rate of the fans 102, 104, and 106.

Fan 1 102, fan 2 104, and fan N 106 may transmit an analog signal for the RPM to the EC 114, such as through PWM 1 108, PWM 2 110, and PWM N 112, respectively, when the PWM modulators also include a digital-to-analog converter (DAC). The PWM 1 108, PWM 2 110, and PWM N 112 may then transmit a digital signal to the embedded controller (EC) 114 representing the RPM of each respective fan. For example, the digital signal to the EC 114 may be a tachometer signal. In some embodiments, the fans 102, 104, and 106 may be coupled directly to the EC 114.

The EC 114 may control one parameter relating to the fans 102, 104, and 106, while monitoring another parameter relating to the fans 102, 104, and 106 to determine potential blockage. For example, the EC 114 may control the PWM 108, 110, and 112 to speed up or slow down the rotational rate of the fans 102, 104, and 106, respectively, to a target value and monitor the PWM duty cycle used to obtain the target value. In another embodiment, the EC 114 may adjust the rotational rate of the fan 1 102, fan 2 104, and/or fan N 106 fan to obtain a desired duty cycle value of the PWM signal from PWM 108, 110, and 112, respectively. After determining the duty cycle value of the PWM signal or the rotational rate for fan 1 102, fan 2 104, and/or fan N 106 needed to achieve the target value(s), the EC 114 may determine whether the measured value(s) satisfy certain criteria, such as meeting or crossing the threshold for the measured value. For example, the EC may implement an algorithm that may use a linear curve approach with a percentage deviation from the nominal fan response curve. In some embodiments, the threshold may be a percentage deviation from the nominal expected rotations per minute (RPM) curves because of varying RPM values on a linear curve for fan operation.

Figure 2:
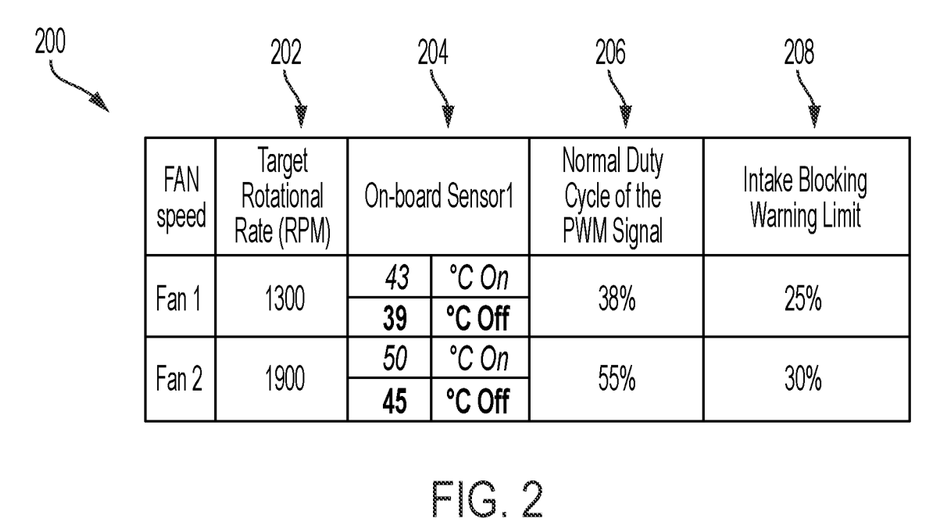
FIG. 2 is a table illustrating example fan management settings according to some embodiments of the disclosure.

For the determination of measured values, each fan may have a target value and threshold value in the EC 114 or may share a target value and threshold value depending on the system requirements. In certain embodiments, the target values may be stored in the basic input/output system (BIOS) 116 for retrieval. FIG. 2 depicts a table of example fan management settings that may be stored in the information handling system. In some embodiments, the fan management settings may be stored in the BIOS 116 or any other component in the information handling system. Table 200 may specify the target rotational rate 202 of a first fan and a second fan. For example, the target rotational rate for the first fan or fan 1 102 may be 1300 RPM. The normal duty cycle of the pulse width modulation (PWM) signal 206 of fan 1 102 for the target rotational rate 202 according to table 200 may be 38% as listed in column 206. Based on table 200, fan 1 102 may be determined to be operating normally when the duty cycle value of the PWM signal to obtain 1300 RPM is 40%. Additionally, the duty cycle value of the PWM signal for fan 1 102 does not meet or cross the threshold such as the intake blocking warning limit 208 for the first fan of 25%. In this scenario, the information handling system may not notify the user because the information handling system determined that there is no fan blockage.

In a N fan system configuration, the information handling system may determine the duty cycle value of the PWM signal for the second fan or each of N fans. For example, fan 2 104 may have a target rotational rate 202 of 1900 RPM, a normal duty cycle value of the PWM signal 206 at that target rotational rate 202 of 55% shown in column 206, and an intake blocking warning limit 208 set at 30%. If the duty cycle value of the PWM signal for fan 2 104 falls below 30% while maintaining the fan rotational rate 202 of 1900, then the system may notify the user of a potential blockage of the fan 2 104. For example, when the duty cycle value of the PWM signal of fan 2 104 is 25% at the target rotational rate 202, then the duty cycle value of the PWM signal of fan 2 104 has crossed the intake blocking warning limit 208 threshold of 30%. In another embodiment, the information handling system may notify the user based on the duty cycle value of the PWM of the fan meeting or crossing a threshold related to normal operating conditions. For example, Fan 2 104 may be blocked because it is operating below the normal duty cycle value of the PWM signal 206, and the information handling system may generate a notification to the user. In some embodiments, the notification may inform the user that the inlet and/or outlet of the fan may be blocked and may prompt the user to re-position the information handling system. In some embodiments, the information handling system may prompt the user to select an operational mode such as a mode shown in FIG. 6. In some embodiments in which the information handling system has dual fan systems and one fan is determined to be partially or fully blocked, then the information handling system could increase RPM, when allowed by noise level allowances, of a second fan to provide additional airflow to the information handling system to make up for lost airflow from a first fan. For example if an information handling system has N fans, the information handling system may increase RPM for one or N fans based on fan blockage in the system.

The information handling system may consider additional criteria, such as the temperature or an audio input, along with the duty cycle value of the PWM signal of the fan to determine whether there is fan blockage before generating a notification. In some embodiments, N fans may follow a linear PWM response curve correlating an input sensor temperature to a PWM duty cycle for the fans, and the response curve may be based on one or more temperature sensor curves that may be aggregated to derive a final RPM value. The additional factors for consideration may be stored in the embedded controller or in another medium or component in the information handling system. In some embodiments, the information handling system may consider the operational mode and/or processing speed of the central processing unit, such as CPU 118, in determining threshold values for determining whether a blockage exists. Some other factors for consideration may include the temperature of the information handling system, which may be compared to expected values in the fan management settings such as table 200. The information handling system may use the temperature thresholds for an on-board sensor 204 to turn on or off one or more fans in the system. For example, if the on-board sensor 204 reads 35° C., fan 1 and fan 2 may be off. During operation of the information handling system, the temperature of the information handling system may rise, and if the on-board sensor 204 reads 45° C., the first fan such as fan 1 102 may turn on with a target rotational rate 202 of 1300 RPM. In other embodiments, the algorithm may be based on an audio input such as the acoustic levels of the fan and/or ambient sounds for detecting the fan blockage. For example, a frequency or pitch of the fan turning may change based on an amount of obstruction of the fan. As another example, when blockage is observed and the audio mic detects a loud noise floor environment, then the system acoustic sound level of the fan could use AI logic based on ambient environmental noise to exceed the audible spec of the fan in attempts to fix the issue without disruption to the user. In some embodiments, the algorithm may be based on a fan motor failure or fan blade obstruction. The fan blade obstruction, for example, may occur when the fan blade is halted by a foreign object and may be determined using a test such as the UL/TUV test. For example, a UL/TUV test may determine whether a IEC62368-1 single fault condition is present. The information handling system may receive data related to the additional factors from a sensor hub and/or any other component to detect the fan blockage.

For some embodiments, the information handling system may implement the algorithm that may include programmable rule(s) in an embedded controller such as EC 114, which may detect the fan blockage and notify the user before the information handling system overheats, becomes noisier, becomes slower in processing speed, and/or shutdowns. Implementation of the algorithm in the embedded controller may include various techniques. In some embodiments, the information handling system and/or embedded controller may use machine learning models to predict the fan blockage. For example, the information handling system and/or the embedded controller may sample the duty cycle value of the PWM signal for the fan for a harsh environment. Based on the sampling of values over a predetermined period of time, the information handling system may predict when the inlet of the fan may be blocked by debris or another object. The sampled values may include the duty cycle value of the PWM signal of the fan, the rotational rate of the fan, or other criteria to determine whether a threshold has been met or crossed based on the known environment for the system. With machine learning, the information handling system may notify the user before the information handling system experiences operational issues. In some embodiments, machine learning models may include logistic regression techniques, linear discriminant analysis, linear regression analysis, artificial neural networks, machine learning classifier algorithms, or classification/regression trees. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received environmental data, and a system or environmental characteristic and/or a degree to which such an influencing attribute affects the outcome of such a system or environmental characteristic.

Figure 3:
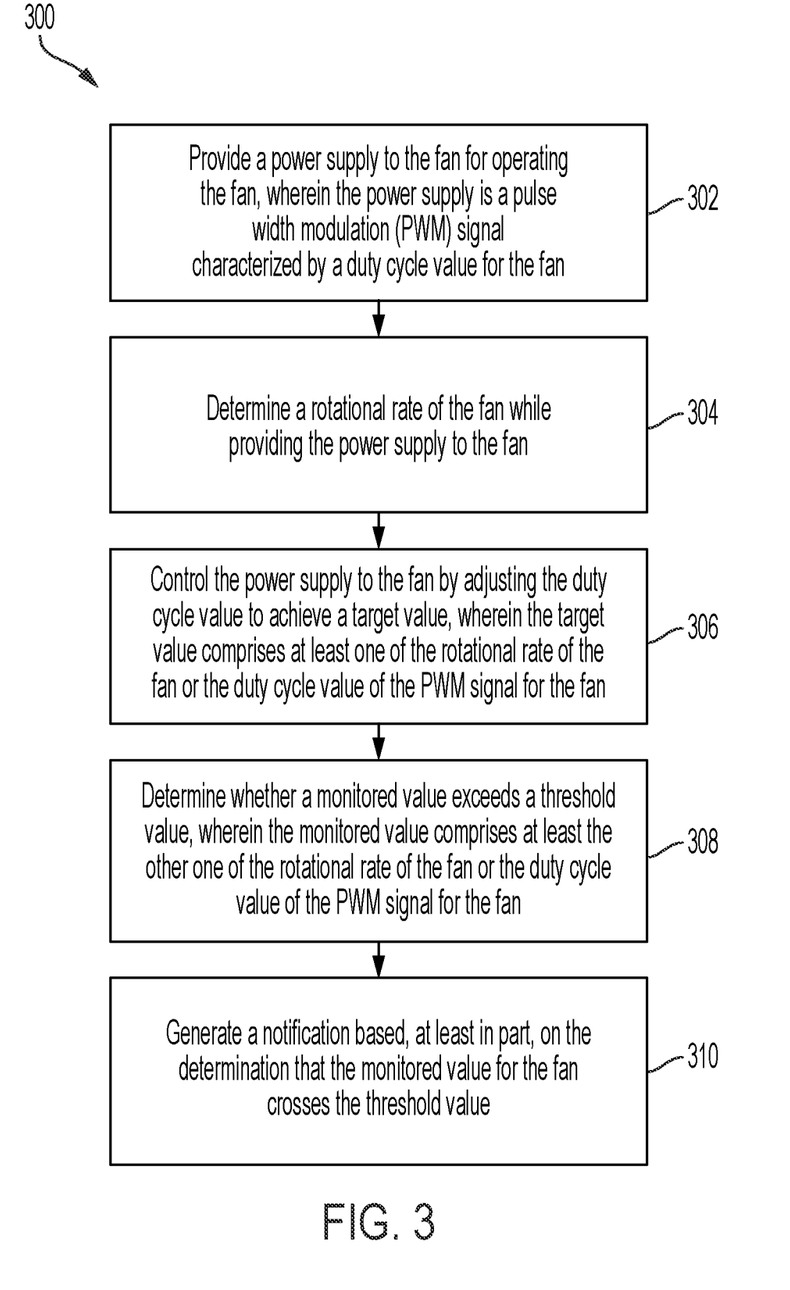
FIG. 3 is a flow chart illustrating a method of detecting a fan blockage of an information handling system according to some embodiments of the disclosure.

The information handling system may implement the algorithm that may include programmable rule(s) with the embedded controller or may include another component in conjunction with the embedded controller. FIG. 3 shows a flow chart for a method of detecting the fan blockage of an information handling system. Method 300 may include block 302 for providing, by an information handling system, a power supply to the fan for operating the fan, wherein the power supply is a pulse width modulation (PWM) signal characterized by a duty cycle value for the fan. In some embodiments, the information handling system may include an integrated PWM, and the power supply signal may be a DC level. For example, the information handling system may provide a normal duty cycle value of the PWM signal 206 for a fan, such as 38% for fan 1 102. At block 304, the information handling system may determine a rotational rate of the fan while providing the power supply to the fan. To achieve a target rotational rate of the fan or the duty cycle value of the PWM signal for the fan, the information handling system, at block 306, may control the power supply to the fan by adjusting the duty cycle value to achieve a target value, wherein the target value includes at least one of the rotational rate of the fan or the duty cycle value of the PWM signal for the fan. In some embodiments, the embedded controller in an information handling system may control the PWM signal to the fan, determine the RPM of the fan using a tachometer, and may monitor different PWM values to determine fan blockage. The information handling system may control settings and/or parameters in the embedded controller and/or the BIOS. In some embodiments, the information handling system may determine target and measured values for one or more of N fans.

At block 308, the information handling system may determine whether a monitored value exceeds a threshold value, wherein the monitored value includes at least the other one of the rotational rate of the fan or the duty cycle value of the PWM signal for the fan. For example, the information handling system may receive the rotational rate of the fan and use the rotational rate data for determining whether the rotational rate of the fan meets a threshold such as a RPM warning limit of the fan.

Figure 5A:
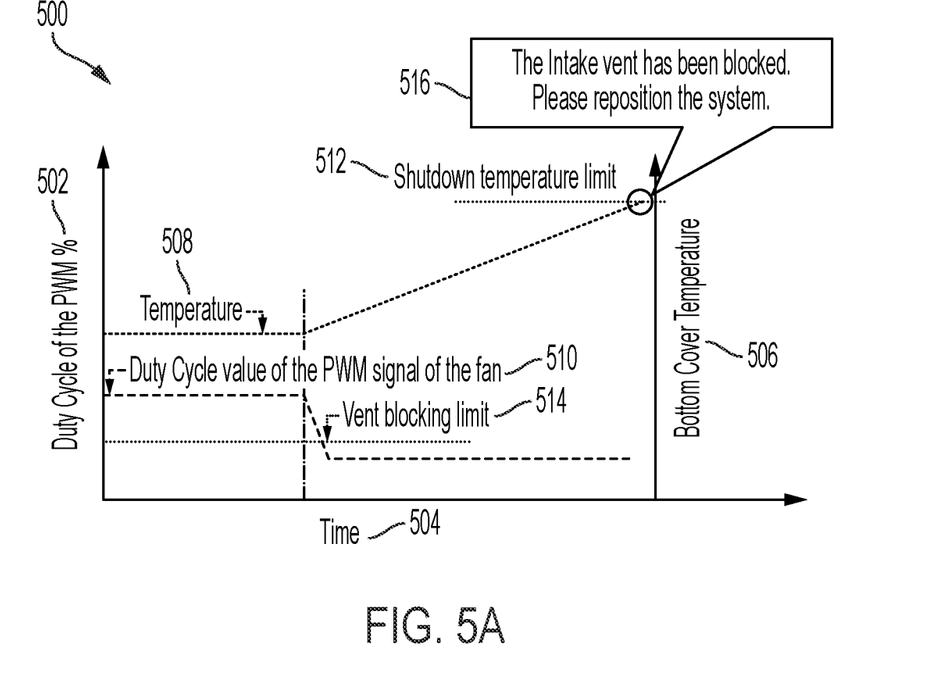
FIG. 5A is a graph illustrating a method based on a pulse width, a temperature, a pulse width threshold, and a temperature threshold according to some embodiments of the disclosure.

In some embodiments, the threshold may include an intake blocking warning limit 208 or any other duty cycle value of the PWM signal threshold such as the normal duty cycle value of the PWM signal 206. For example, the information handling system may determine that a fan with a duty cycle value of the PWM signal of 45% may meet or cross an intake blocking warning limit of 50%. In another embodiment, the information handling system may further determine whether the rotational rate of the fan meets another threshold such as a maximum rotational rate value. In certain embodiments, the information handling system may also receive data about other factors including, but not limited to, the actual rotational rate of the fan, a temperature of the information handling system, an audio input from the fan, or any other data input for comparison with a respective threshold at block 308. For example, the information may further determine whether the temperature of the information handling system meets a threshold. FIG. 5A shows a temperature 508 of the information handling system, which may be compared with the bottom cover temperature 506. In certain embodiments, the information handling system may also determine whether the audio input of the fan or from the ambient surroundings meets a threshold such as a decibel limit. These embodiments may be implemented in conjunction with the algorithm based on the pulse width of the fan.

Figure 5B:
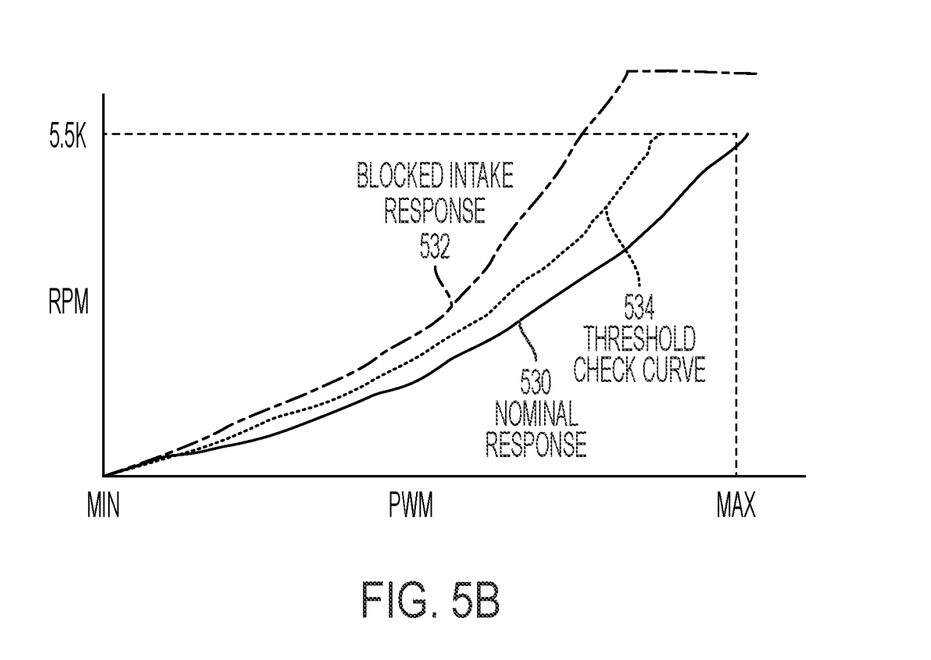
FIG. 5B is a graph illustrating an example threshold based on a curve according to some embodiments of the disclosure.

Another example threshold for determining fan blockage is based on a linear curve as shown in FIG. 5B. FIG. 5B is a graph illustrating an example threshold based on a curve according to some embodiments of the disclosure. The graph illustrates a nominal response line 530 for a relationship between duty cycle of the PWM signal on the x-axis to fan RPM on the y-axis. A blocked intake response line 532 shows a relationship between duty cycle of the PWM signal to fan RPM when the fan is fully blocked. A threshold change curve 534 may illustrate an example set of threshold values to use when determining if a monitored value of either RPM or duty cycle of the PWM signal should generate a notification to a user or performance of another action by the information handling system. The threshold change curve 534 may be values that are within a certain percentage of the nominal response line 530.

After the information handling system determines that the monitored value for the fan, such as the rotational rate of the fan or the duty cycle value of the PWM signal for the fan, meets or crosses a threshold value, block 310 may involve the information handling system generating a notification. The notification may indicate fan blockage. In some embodiments, the notification may inform the user that the inlet and/or outlet of the fan may be blocked and may prompt the user to re-position the information handling system. For example, the information handling system may determine that the inlet of the fan is partially or fully blocked may notify the user to lift the system off of the lap, pillow or other surface and/or to remove an obstruction. The information handling system may determine which fan may be blocked and whether the fan blockage may be located at the inlet, outlet, or alternate location of the fan.

Figure 6:
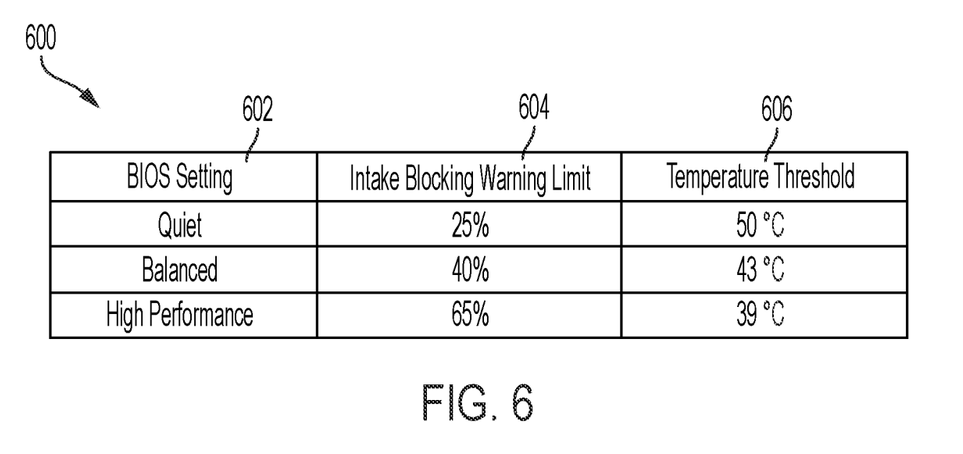
FIG. 6 is a table illustrating example fan management settings for user-selectable profiles according to some embodiments of the disclosure.

In some embodiments, the information handling system may prompt the user to select an operational mode such as a mode shown in FIG. 6. If the information handling system implements one or more factors for determining whether the fan is blocked, method 300 may be expanded to include additional thresholds.

Figure 4:
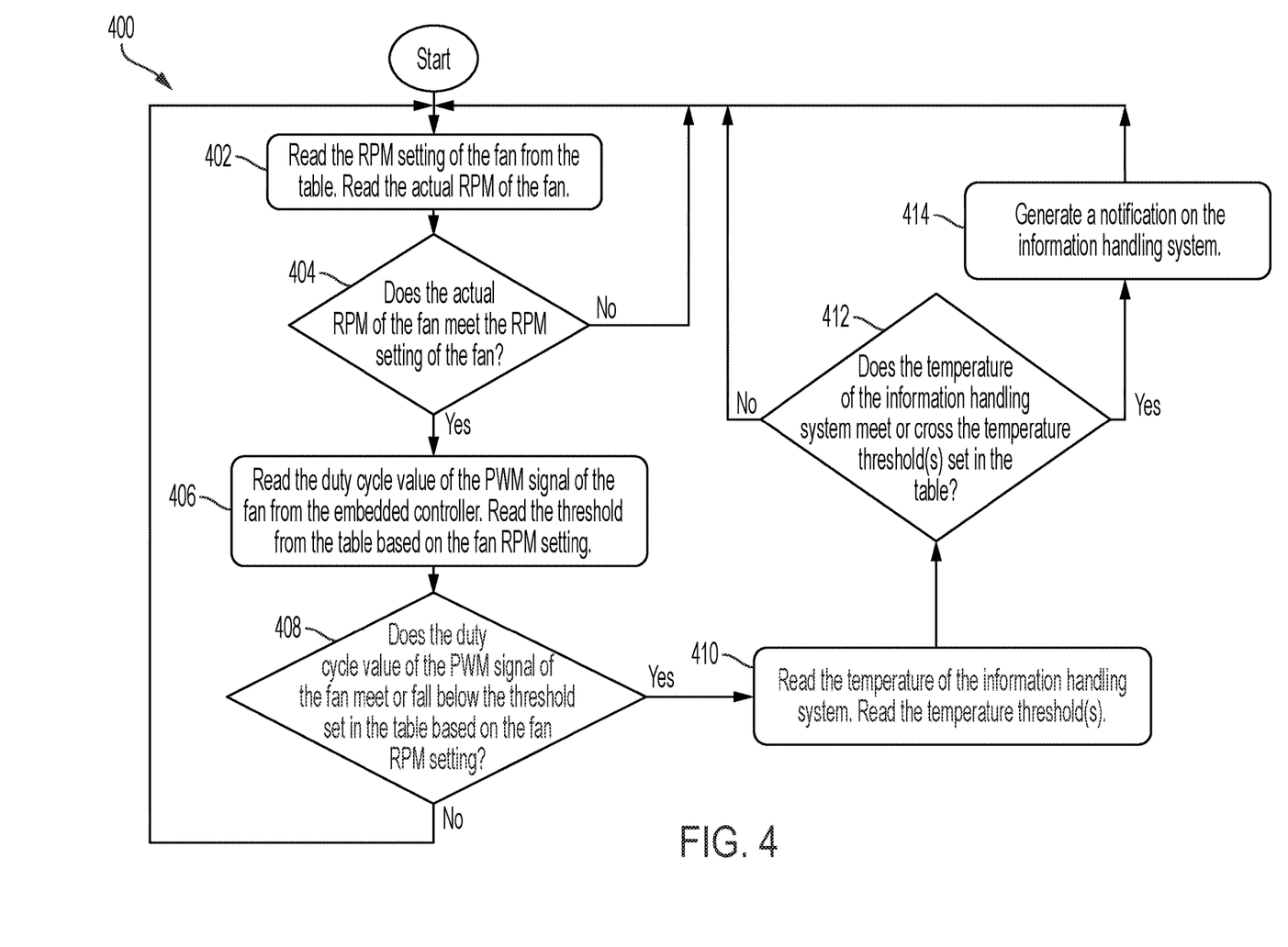
FIG. 4 is a flow chart illustrating a method of detecting the fan blockage of an information handling system according to some embodiments of the disclosure.

Method 400 shown in FIG. 4 depicts an example of additional thresholds, which the information handling system may consider when determining whether a factor meets a particular threshold. Step 402 may involve the information handling system reading a target rotational rate or another value indicative of a RPM setting for a fan in the information handling system. In some embodiments, the information handling system may have a setting for a fixed duty cycle value of the pulse width modulation (PWM) signal for the fan. Values such as the duty cycle value and the RPM setting may be stored in a table such as table 200. The information handling system may also read the actual rotational rate of the fan. In step 404, the information handling system may determine whether the actual rotational rate of the fan meets or crosses the RPM setting of the fan. If the actual rotational rate of the fan does not meet the RPM setting, then the method 400 re-starts at step 402. In some embodiments, the threshold may be a nominal response curve for the fan at all PWM signals corresponding to a RPM value, and the information handling system may determine fan blockage by represent measured values as another curve. For example, the measured value curve may be parallel to the nominal response curve. In this example, the information handling system may determine fan blockage, and the measured value curve may be at a lower duty cycle value for the PWM signal with a target RPM value or a lower RPM value with a target duty cycle value for the PWM signal. In other embodiments, the fan blockage threshold may be based on the measured value crossing into a curve region or a fixed percentage deviation from the nominal response curve that may be stored in the embedded controller. If the actual rotational rate of the fan meets the RPM setting, then the information handling system, at step 406, may read the actual duty cycle value of the PWM signal for the fan. In some embodiments, the embedded controller may determine the rotational rate, the duty cycle value, or the threshold for the fan to achieve a target value. The threshold may also be specified in the embedded controller. In other embodiments, the threshold may be specified and stored in the BIOS. For example, the threshold may include the intake blocking warning limit 208 or the normal duty cycle value of the PWM signal 206 shown in table 200.

At step 408, the information handling system may determine whether the duty cycle value of the PWM signal of the fan meets, crosses, or falls below the threshold set in the information handling system. If the duty cycle value of the PWM signal of the fan does not meet the threshold, then the method 400 re-starts at step 402. If the measured duty cycle value of the PWM signal of the fan meets the threshold, the information handling system may further read the temperature of the information handling system at step 410. In addition, the information handling system may also read a temperature threshold(s) specified in the information handling system. In some embodiments, the temperature thresholds may by stored in a table 200 similar to the threshold(s) for the duty cycle value of the PWM signal or the rotational rate of the fan. The temperature threshold(s) may vary and may include a shutdown temperature limit or threshold 512, the temperature thresholds for the on-board sensor 204 to turn on or off one or N fans in the system, or any other temperature threshold that may indicate a blocked fan. Step 412 may involve the information handling system determining whether the temperature of the information handling system meets or crosses the temperature threshold(s). If the temperature of the information handling system does not meet the temperature threshold(s), then the method 400 re-starts at step 402. If the information handling system determines that the temperature of the information handling system meets or crosses the temperature threshold(s), then, at step 414, the information handling system may generate a notification regarding the fan blockage. In some embodiments, the notification may inform the user that the inlet and/or the outlet vent of the fan is blocked. In certain embodiments, the notification may recommend that the user re-position the information handling system. To cost-effectively detect the fan blockage and notify the user of the fan blockage, the methods and processes discussed in above may be implemented by the embedded controller.

In some embodiments, method 300 and method 400 may be entirely implemented by an embedded controller in the information handling system. By implementing the algorithm that may include programmable rule(s), the information handling system may reduce or eliminate additional hardware costs and interactions with other parts of the information handling system. FIG. 5A is a graph illustrating method 400 over a period of time 504. The graph 500 has two additional axis for the duty cycle value of the pulse width modulation (PWM) percentage 502 and a temperature 506 of a bottom cover of the information handling system, sometimes referred to as a "skin temperature." In some embodiments, the threshold at step 406 may include a vent blocking limit 514. The determination, by the information handling system, at step 408 may be a comparison between the duty cycle of the PWM signal of the fan 510 and the vent blocking limit 514. When the duty cycle of the PWM signal of the fan 510 falls meets, crosses, or falls below the vent blocking limit 514, the information handling system may generate a notification 516 for the user about the fan blockage. A fully open fan, for example, may have a duty cycle of the PWM signal of 98%, and when the fan may be fully blocked, it may have a duty cycle of the PWM signal of 53%. The embedded controller in the information handling system may detect the 46% difference in duty cycle of the PWM signal of the fan to also determine fan blockage. In some embodiments, the information embedded controller in the information handling system may detect the difference between a rotational rate setting and a measure rotational rate setting for the fan to determine fan blockage. In some embodiments, the embedded controller may determine whether the difference in duty cycle of the PWM signal of the fan may meet a threshold such a percentage change threshold for the duty cycle of the PWM signal.

In certain embodiments, the information handling system may also read the temperature 508 and a shutdown temperature limit 512 at step 410. In this example, the temperature 508 and the shutdown temperature limit 512 may be based on the bottom cover temperature 506 of the information handling system. At step 412, the information handling system may determine whether the temperature 508 meets or crosses the shutdown temperature limit 512. In some embodiments, the information handling system may generate a notification 516 to inform the user that the intake vent has been blocked and to re-position the system. In some embodiments, if the user acts and re-positions the information handling system, the information handling system may determine that the fan blockage has been removed and may remote the notification to the user. In various embodiments, the information handling system may generate a notification similar to notification 516 based on the comparison between the pulse width of the 510 and any other pulse width threshold such as the vent blocking limit 514. In some embodiments, the information handling system may prompt the user to select an operational mode from fan management settings.

FIG. 6 illustrates an example table with operational modes for the one or N fans. Table 600 may represent fan management settings that a user may select. The BIOS setting 602 may include one or more user-configurable operational modes with an intake blocking warning limit 604 threshold and/or a temperature threshold 606. For example, the fan management settings may include a Quiet mode, which may have a lower threshold based on the intake blocking warning limit 604 or any other duty cycle of the PWM signal of the fan and a higher temperature threshold 606. A user may select the Quiet Mode to reduce fan usage because of noise so the information handling system may require 25% threshold based on the intake blocking warning limit 604 of the fan and/or a 50° C. temperature threshold 606. The settings may further include a Balanced mode, which may have a 40% threshold based on the intake blocking warning limit 604 of the fan and/or a 43° C. temperature threshold 606. Another setting may include the High Performance mode, which may have a 65% threshold based on the intake blocking warning limit 604 of the fan and/or a 39° C. temperature threshold 606. In contrast to Quiet mode, a user may select the High Performance mode to increase the fan usage to lower the information handling temperature and to reduce or prevent thermal throttling that may impact the CPU. In another embodiment, the fan management settings may include a rotational rate. In some embodiments, the operational mode table may be stored outside the BIOS. The algorithms may use information and settings from fan management table, such as table 600, to provide supply power and to achieve target values for cooling the information handling system.

The implementation of the methods and algorithms that may include programmable rule(s) described and illustrated above may be applied to a conventional fan, a dual opposite outlet (DOO) fan, or any other type of fan. The information handling system may detect the fan blockage of the DOO fan such as the DOO fan described in U.S. Pat. No. 10,584,717, which is incorporated by reference herein. The DOO fan may include one or more air inlet(s) to draw in air into the fan and at least two air outlet(s) that may be opposite one another so that the flow of air out of the DOO fan may happen in generally opposite directions. In some examples, the DOO fan may be sealed around the inlet vents and/or the outlet or exhaust vents to direct pressurized air in the pressurized zone. Because of the design and/or features of the DOO fan, the information handling system with the DOO fan may experience additional operational issues if the inlet and/or outlet vent(s) are blocked.

Figure 7:
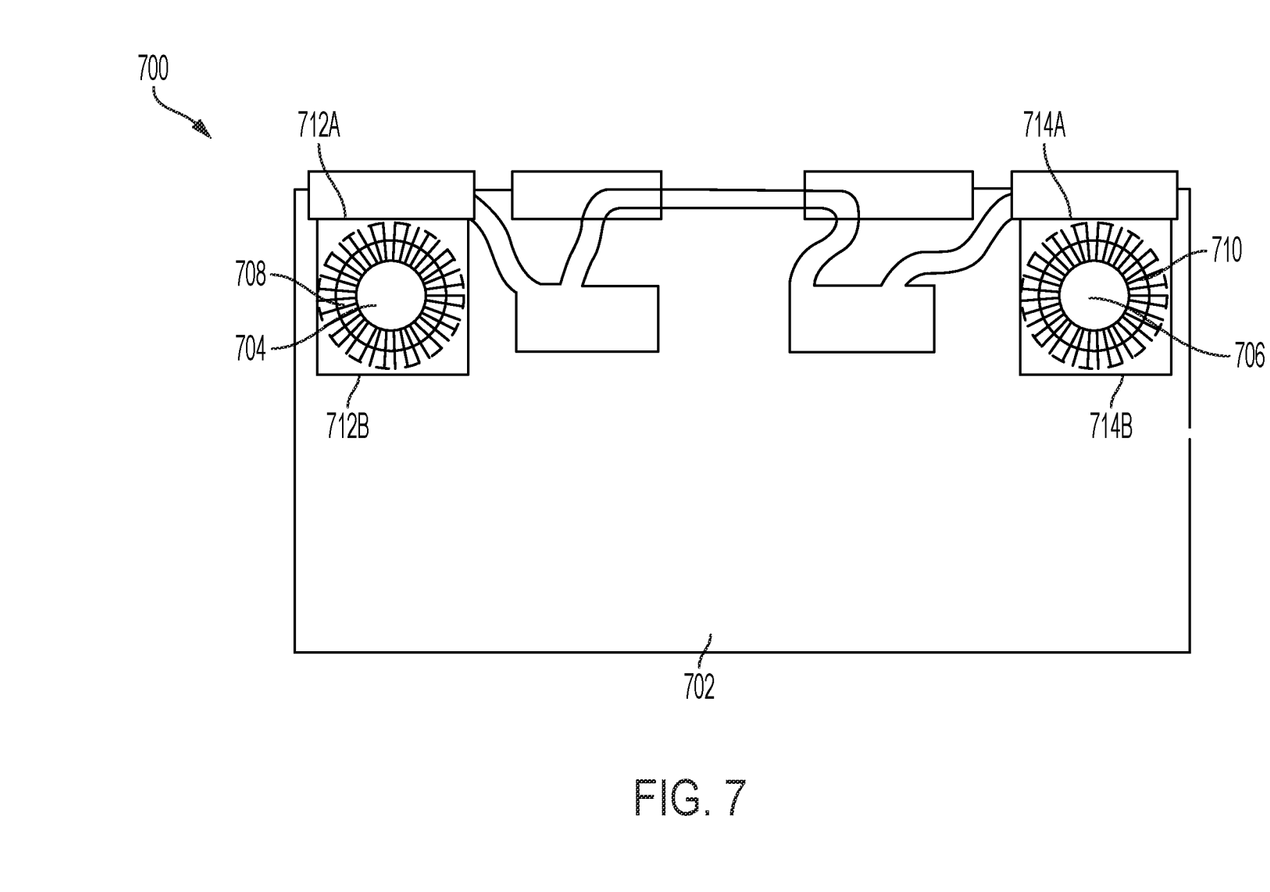
FIG. 7 is an illustration of an example of two dual opposite outlet fans in an information handling system according to some embodiments of the disclosure.

Therefore, it may be advantageous to apply the methods described above to the DOO fan. For any fan, the inlet(s) and/or outlet(s) may be any shape and positioned in any location on the fan and/or information handling system. In various embodiments, the information handling system may have one or N fans that may be one or N DOO fans. FIG. 7 shows an example information handling system 700 with two DOO fans. A first DOO fan 704 and a second DOO fan 706 may be located on the bottom surface 702 of a laptop 700, for example, or on any other surface. The first DOO fan 704 may include an inlet 708, and the second DOO fan 706 may include an inlet 710. In some embodiments, the first DOO fan 704 and/or the second DOO fan 706 may include one or more inlets, which may depend on the information handling system configuration. Both DOO fans may have at least two outlets, and the first DOO fan 704 may have outlets 712A and 712B, which may allow the flow of air out of the DOO fan in generally opposite directions. The second DOO fan 706 may have outlets 714A and 714B for air flow circulation. One advantage of the DOO fan is that it improves air flow circulation and/or re-circulation without sacrificing size and/or space. The usage of the DOO fan alone or in combination with a conventional fan may be implemented in any type of information handling system.

These example embodiments described and illustrated above may be implemented in an information handling system. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
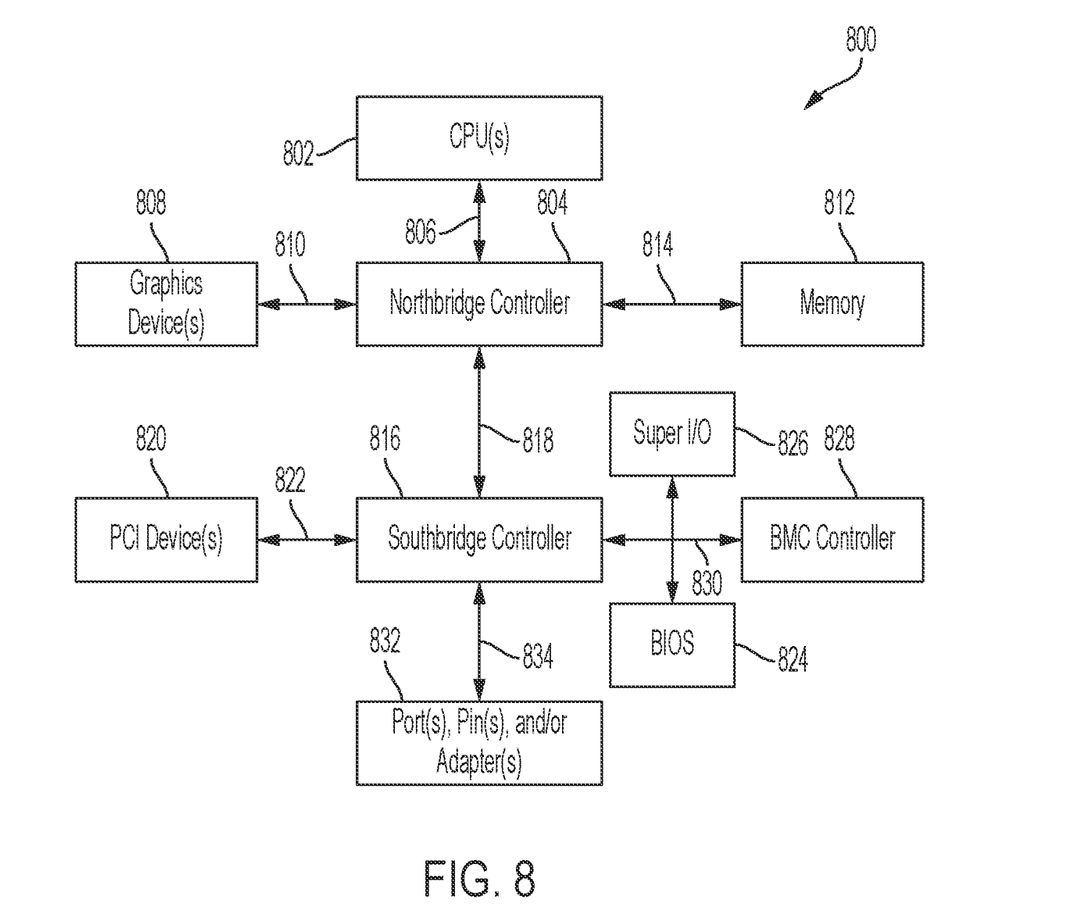
FIG. 8 is a schematic block diagram of an example information handling system according to some embodiments of the disclosure.

An information handling system may include a variety of components to generate, process, display, manipulate, transmit, and receive information. One example of an information handling system 800 is shown in FIG. 8. IHS 800 may include one or more central processing units (CPUs) 802. In some embodiments, IHS 800 may be a single-processor system with a single CPU 802, while in other embodiments IHS 800 may be a multi-processor system including two or more CPUs 802 (e.g., two, four, eight, or any other suitable number). CPU(s) 802 may include any processor capable of executing program instructions. For example, CPU(s) 802 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 802 may commonly, but not necessarily, implement the same ISA.

CPU(s) 802 may be coupled to northbridge controller or chipset 804 via front-side bus 806. The front-side bus 806 may include multiple data links arranged in a set or bus configuration. Northbridge controller 804 may be configured to coordinate I/O traffic between CPU(s) 802 and other components. For example, northbridge controller 804 may be coupled to graphics device(s) 808 (e.g., one or more video cards or adaptors, etc.) via graphics bus 810 (e.g., an Accelerated Graphics Port or AGP bus, a Peripheral Component Interconnect or PCI bus, etc.). Northbridge controller 804 may also be coupled to system memory 812 via memory bus 814. Memory 812 may be configured to store program instructions and/or data accessible by CPU(s) 802. In various embodiments, memory 812 may be implemented using any suitable memory technology, such as static RAM (SRAM), synchronous dynamic RAM (SDRAM), nonvolatile/Flash-type memory, or any other type of memory.

Northbridge controller 804 may be coupled to southbridge controller or chipset 816 via internal bus 818. Generally, southbridge controller 816 may be configured to handle various of IHS 800's I/O operations, and it may provide interfaces such as, for instance, Universal Serial Bus (USB), audio, serial, parallel, Ethernet, etc., via port(s), pin(s), and/or adapter(s) 832 over bus 834. For example, southbridge controller 816 may be configured to allow data to be exchanged between IHS 800 and other devices, such as other IHS s attached to a network. In various embodiments, southbridge controller 816 may support communication via wired or wireless general data networks, such as any suitable type of Ethernet network, via telecommunications/telephony networks such as analog voice networks or digital fiber communications networks; via storage area networks such as Fiber Channel SANs, or via any other suitable type of network and/or protocol.

Southbridge controller 816 may also enable connection to one or more keyboards, keypads, touch screens, scanning devices, voice or optical recognition devices, or any other devices suitable for entering or retrieving data. Multiple I/O devices may be present in IHS 800. In some embodiments, I/O devices may be separate from IHS 800 and may interact with IHS 800 through a wired or wireless connection. As shown, southbridge controller 816 may be further coupled to one or more PCI devices 820 (e.g., modems, network cards, sound cards, video cards, etc.) via PCI bus 822. Southbridge controller 816 may also be coupled to Basic I/O System (BIOS) 824, Super I/O Controller 826, and Baseboard Management Controller (BMC) 828 via Low Pin Count (LPC) bus 830.

BIOS 824 may include non-volatile memory having program instructions stored thereon. The instructions stored on the BIOS may be usable CPU(s) 802 to initialize and test other hardware components and/or to load an Operating System (OS) onto IHS 800, for example during a pre-boot stage. For example, BIOS may also refer to a set of instructions, stored on BIOS 824, that are executed by CPU(s) 802. As such, BIOS 824 may include a firmware interface that allows CPU(s) 802 to load and execute certain firmware, as described in more detail below. In some cases, such firmware may include program code that is compatible with the Unified Extensible Firmware Interface (UEFI) specification, although other types of firmware may be used.

BMC controller 828 may include non-volatile memory having program instructions stored thereon that are usable by CPU(s) 802 to enable remote management of IHS 800. For example, BMC controller 828 may enable a user to discover, configure, and manage BMC controller 828, setup configuration options, resolve and administer hardware or software problems, etc. Additionally or alternatively, BMC controller 828 may include one or more firmware volumes, each volume having one or more firmware files used by the BIOS' firmware interface to initialize and test components of IHS 800.

Super I/O Controller 826 combines interfaces for a variety of lower bandwidth or low data rate devices. Those devices may include, for example, floppy disks, parallel ports, keyboard and mouse, temperature sensor and fan speed monitoring, etc.

In some embodiments, IHS 800 may be configured to access different types of computer-accessible media separate from memory 812. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 800 via northbridge controller 804 and/or southbridge controller 816.

In some embodiments, northbridge controller 804 may be combined with southbridge controller 816, and/or be at least partially incorporated into CPU(s) 802. In other implementations, one or more of the devices or components shown in FIG. 8 may be absent, or one or more other components may be added. Accordingly, systems and methods described herein may be implemented or executed with other computer system configurations. In some cases, various elements shown in FIG. 8 may be mounted on a motherboard and protected by a chassis or the like.

The schematic flow chart diagram of FIG. 2 and FIG. 3 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller or embedded controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can include random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although embedded controllers are described throughout the detailed description, aspects of the invention may be applied to the design of or implemented on different kinds of controllers, or processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   providing, by an information handling system, a power supply to a fan for operating the fan, wherein the power supply is a pulse width modulation (PWM) signal characterized by a duty cycle value for the fan;
   determining, by the information handling system, a rotational rate of the fan while providing the power supply to the fan;
   controlling, by the information handling system, the power supply to the fan by adjusting the duty cycle value to achieve a target value, wherein the target value comprises at least the rotational rate of the fan;
   determining, by the information handling system, whether a monitored value exceeds a threshold value, wherein the monitored value comprises at least the duty cycle value of the PWM signal for the fan; and
   generating, by the information handling system, a notification based, at least in part, on the determination that the monitored value for the fan crosses the threshold value.

2. The method of claim 1, further comprising adjusting, by the information handling system, the power supply based on the determination whether the monitored value exceeds the threshold value.

3. The method of claim 1, wherein the step of determining, by the information handling system, whether the monitored value exceeds the threshold value further comprises receiving the monitored value over a predetermined period of time.

4. The method of claim 1, further comprising:
determining, by the information handling system, a temperature of the information handling system; and
determining, by the information handling system, whether the temperature of the information handling system crosses a threshold temperature value,
wherein the step of generating, by the information handling system, the notification is further based, at least in part, on the determination of whether the temperature of the information handling system crosses the threshold temperature value.

5. The method of claim 1, wherein the step of determining, by the information handling system, whether the monitored value exceeds the threshold value further comprises determining whether the monitored value exceeds a percentage deviation from an expected value for the monitored value.

6. The method of claim 1, wherein the threshold value is based on a linear curve correlating a plurality of rotational rates of the fans with a plurality of duty cycle values of the PWM signal for the fan.

7. The method of claim 1, further comprising:
determining a potential future blockage event based, at least in part, on data collected regarding the monitored value.

8. An information handling system, comprising:
a memory; and
a processor coupled to the memory, wherein the processor is configured to perform the steps comprising:
providing a power supply to a fan for operating the fan, wherein the power supply is a pulse width modulation (PWM) signal characterized by a duty cycle value for the fan;
determining a rotational rate of the fan while providing the power supply to the fan;
controlling the power supply to the fan by adjusting the duty cycle value to achieve a target value, wherein the target value comprises at least the rotational rate of the fan;
determining whether a monitored value exceeds a threshold value, wherein the monitored value comprises at least the duty cycle value of the PWM signal for the fan; and
generating a notification based, at least in part, on the determination that the monitored value for the fan crosses the threshold value.

9. The information handling system of claim 8, wherein the processor is further configured to perform the steps comprising adjusting the power supply based on the determination whether the monitored value exceeds the threshold value.

10. The information handling system of claim 8, wherein the step of determining whether the monitored exceeds the threshold value further comprises sampling the monitored value over a predetermined period of time.

11. The information handling system of claim 8, wherein the processor is further configured to perform the steps comprising:
determining a temperature of the information handling system; and
determining whether the temperature of the information handling system crosses a threshold temperature value,
wherein the step of generating the notification is further based, at least in part, on the determination of whether the temperature of the information handling system crosses the threshold temperature value.

12. The information handling system of claim 8, wherein the step of determining whether the monitored value exceeds a threshold value further comprises determining a percentage deviation from an expected value for the monitored value.

13. The information handling system of claim 8, wherein the processor is further configured to perform the steps comprising:
determining a potential future blockage event based, at least in part, on data regarding the monitored value.

14. The information handling system of claim 8, further comprising a dual opposite outlet fan, wherein the step of controlling the power supply to the fan comprises controlling a power supply to the dual opposite outlet fan.

15. A computer program product comprising:
a non-transitory computer readable medium comprising instructions for causing a processor to perform steps comprising:
providing a power supply to a fan for operating the fan, wherein the power supply is a pulse width modulation (PWM) signal characterized by a duty cycle value for the fan;
determining a rotational rate of the fan while providing the power supply to the fan;
controlling the power supply to the fan by adjusting the duty cycle value to achieve a target value, wherein the target value comprises at least the rotational rate of the fan;
determining whether a monitored value exceeds a threshold value, wherein the monitored value comprises at least the duty cycle value of the PWM signal for the fan; and
generating a notification based, at least in part, on the determination that the monitored value for the fan crosses the threshold value.

16. The computer program product of claim 15, wherein the non-transitory computer readable medium further comprises instructions for adjusting the power supply based on the determination whether the monitored value exceeds the threshold value.

17. The computer program product of claim 15, wherein the instructions for determining whether the monitored value exceeds the threshold value further comprises sampling the monitored value over a predetermined period of time.

18. The computer program product of claim 15, wherein the non-transitory computer readable medium further comprises instructions for:
determining a temperature of the information handling system; and
determining whether the temperature of the information handling system crosses a threshold temperature value,
wherein the step of generating the notification is further based, at least in part, on the determination of whether the temperature of the information handling system crosses the threshold temperature value.

19. The computer program product claim 15, wherein the instructions for determining whether the monitored value exceeds the threshold value comprises instructions for determining whether the monitored value exceeds a threshold value comprising a percentage deviation from an expected value for the monitored value.

20. The computer program product of claim 15, wherein the non-transitory computer readable medium further comprises instructions for:
   determining a potential future blockage event based, at least in part, on data collected over a period of time regarding the monitored value.

\* \* \* \* \*